(12) United States Patent
Gorr et al.

(10) Patent No.: US 9,359,090 B2
(45) Date of Patent: Jun. 7, 2016

(54) METHOD FOR PRODUCING AN AIRCRAFT FUSELAGE AND AIRCRAFT FUSELAGE

(75) Inventors: Eugen Gorr, Hamburg (DE); Rolf Bense, Jork (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 327 days.

(21) Appl. No.: 13/320,278

(22) PCT Filed: May 10, 2010

(86) PCT No.: PCT/EP2010/056362
§ 371 (c)(1),
(2), (4) Date: Jan. 5, 2012

(87) PCT Pub. No.: WO2010/130687
PCT Pub. Date: Nov. 18, 2010

(65) Prior Publication Data
US 2012/0132750 A1    May 31, 2012

Related U.S. Application Data

(60) Provisional application No. 61/177,306, filed on May 12, 2009.

(30) Foreign Application Priority Data

May 12, 2009    (DE) .......................... 10 2009 021 369

(51) Int. Cl.
*B64C 1/00*    (2006.01)
*B64F 5/00*    (2006.01)
*B64C 1/06*    (2006.01)

(52) U.S. Cl.
CPC ............... *B64F 5/0009* (2013.01); *B64C 1/061* (2013.01); *B64C 1/069* (2013.01); *B64C 2001/0081* (2013.01); *Y10T 29/49622* (2015.01)

(58) Field of Classification Search
CPC ............................... B64C 1/069; B64F 5/0009
USPC ........... 244/117 R, 119, 120, 129.1, 131, 132
See application file for complete search history.

(56) References Cited

U.S. PATENT DOCUMENTS 5,266,137 A * 11/1993 Hollingsworth ............... 156/156
5,297,760 A *  3/1994 Hart-Smith .................... 244/132

(Continued)

FOREIGN PATENT DOCUMENTS

CN     101081642 A    12/2007
DE        727 196 C    10/1942

(Continued)

OTHER PUBLICATIONS

International Search Report for Appln. No. PCT/EP2010/056362 mailed Apr. 6, 2011.

(Continued)

*Primary Examiner* — Brian M O'Hara
(74) *Attorney, Agent, or Firm* — Carter, DeLuca, Farrell & Schmidt, LLP

(57) ABSTRACT

Disclosed is a method for the manufacture of an aircraft fuselage with at least two fuselage barrels wherein connecting segments are firstly prepared for the formation of a transverse joint region for a later transverse joint, and the fuselage barrels are then constructed around the connecting segments; also disclosed is an aircraft fuselage with ring-type connecting segments for the formation of such a transverse joint.

8 Claims, 4 Drawing Sheets

(56) References Cited

U.S. PATENT DOCUMENTS

| | | | |
|---|---|---|---|
| 5,876,072 A * | 3/1999 | Bross et al. | 285/330 |
| 6,098,928 A * | 8/2000 | Bross et al. | 244/131 |
| 7,325,771 B2 | 2/2008 | Stulc et al. | |
| 7,857,258 B2 * | 12/2010 | Normand et al. | 244/120 |
| 2006/0060705 A1 | 3/2006 | Stulc et al. | |
| 2010/0320321 A1 * | 12/2010 | Sauermann | 244/120 |
| 2011/0265300 A1 * | 11/2011 | Bense et al. | 29/283 |

FOREIGN PATENT DOCUMENTS

| | | | |
|---|---|---|---|
| DE | 952 595 C | 11/1956 | |
| FR | 510 388 A | 12/1920 | |
| FR | 2 915 458 A1 | 10/2008 | |
| GB | 524721 A | 8/1940 | |
| JP | H04 14598 U | 2/1992 | |
| JP | 2010530829 A | 9/2010 | |
| JP | 2011504842 A | 2/2011 | |
| WO | 2010130687 A2 | 11/2010 | |

OTHER PUBLICATIONS

EP Office Action mailed Nov. 9, 2015 in corresponding EP Patent Application No. 10719336.9, 5 pages.

* cited by examiner

METHOD FOR PRODUCING AN AIRCRAFT FUSELAGE AND AIRCRAFT FUSELAGE

TECHNICAL FIELD

The invention concerns a method for the manufacture of an aircraft fuselage and an aircraft fuselage.

BACKGROUND

From the German patent document DE 727 196 it is of known art to construct aircraft fuselages from a multiplicity of fuselage barrels. Adjacent fuselage barrels are connected with one another in the transverse joint region and thereby form a riveted overlap joint with their edge sections. As a result of production, i.e. component, tolerances a radial gap can occur between the overlapping edge sections, at least in some sections. In the case of fuselages of a metal form of construction these gaps can be closed by means of an appropriate deformation of the edge sections during the riveting process. After drilling the fuselage barrels must be separated once again for purposes of cleaning the rivet holes and overlapping surfaces, as a result of which the assembly process becomes protracted. Furthermore a large number of connecting elements, in particular, rivets and stringer couplings, are required; this also has a disadvantageous effect on the assembly process.

The tolerance differences between the fuselage barrels are particularly problematical in the case of carbon fibre reinforced fuselages (CFRP fuselages) since these can hardly be allowed to deform at all. Component tolerances must thus be compensated by means of a filler in the gaps. Accurate metering and accurate positioning of the filler is, however, very difficult and time-intensive because of the limited accessibility, since, in particular during the manufacture of the overlap joint, the filler can flow out, or can be displaced as a result of shearing during the assembly process.

U.S. 2006/0060705 A1 alternatively envisages positioning CFRP fuselage barrels adjacent to one another and riveting their adjacent edge sections by means of a transverse joint strap. However, in this solution of known art the compensation of tolerances between the fuselage barrels by means of accurate metering and positioning of the filler is also critical. Here too during the assembly of the fuselage barrels rivet holes in the transverse joint strap and the fuselage barrels must similarly be cleaned in a laborious and time-intensive manner. Likewise a multiplicity of connecting elements are required, which, by virtue of the specific material properties associated with CFRPs, are particularly disadvantageous.

In contrast, the object of the present invention consists in creating a method for the manufacture of an aircraft fuselage that removes the above-cited disadvantages and renders the compensation of tolerances between fuselage barrels to be connected essentially superfluous, and also an aircraft fuselage manufactured in this manner.

SUMMARY

This object is achieved by means of a method with the features of Claim 1, and by means of an aircraft fuselage with the features of Claim 3.

A method for the manufacture of an aircraft fuselage, with at least two fuselage barrels to be joined with one another, inventively envisages that transverse joint elements required for a transverse joint between the fuselage barrels are aligned with one another and prepared for the transverse joint, and are only inserted into the fuselage barrels in a subsequent step.

What is advantageous in this solution is that essentially no compensation of tolerances is necessary when joining the fuselage barrels, since the transverse joint elements have already been aligned with one another before the manufacture of the fuselage barrels. Thus the same components are created with the same tolerances. In other words, in accordance with the invention the provisional formation of the transverse joint region is first undertaken, and subsequently the manufacture of the fuselage barrels, wherein the fuselage barrels are constructed around the transverse joint elements. In particular it is advantageous that the assembly of the fuselage can take place in a quasi-single step, since the holes for connecting elements are already appropriately prepared, and thus during the assembly process it is only necessary for the connecting elements to be inserted. Any removal of machining chips or reaming of holes to final dimensions is eliminated during fuselage assembly.

In one example of embodiment two ring-type connecting segments and a multiplicity of connecting elements are used as transverse joint elements for purposes of connecting the connecting segments, wherein the ring-type connecting segments reproduce the fuselage cross-section. They are brought together and aligned with one another. Then a multiplicity of seatings is introduced into the connecting segments for the accommodation of the connecting elements. The connecting segments are subsequently separated from one another and the fuselage barrels are created by the arrangement of skin fields on the connecting segments. The fuselage barrels are then connected with one another by bringing the two connecting segments together and inserting the connecting elements. In this example of embodiment it is advantageous that fewer transverse joint elements are necessary than in the case of overlap joints of known art, as a result of which assembly is simplified and processing time is reduced. In particular, lower investment costs are incurred by virtue of the accompanying lower tool diversity and tool numbers. Furthermore, the inventive method can be applied independently of the material of the fuselage, both in the case of metal fuselages, carbon fibre reinforced plastic fuselages, or, for example, sandwich structures such as GLARE®.

A preferred aircraft fuselage has at least two fuselage barrels, which form a transverse joint, and two ring-type connecting segments inserted into the fuselage barrels, which reproduce a fuselage cross-section in the transverse joint region and are connected with one another with a multiplicity of connecting elements. Since the connecting elements and their seatings have already been introduced into the connecting segments before the joining of the fuselage barrels, during the formation of the transverse joint any laborious compensation of tolerances between the fuselage barrels is eliminated.

In one example of embodiment connecting elements are inserted into holes, which are introduced into opposing radial surfaces of the connecting segments. In contrast to the overlap joints of known art no peripheral surfaces are thus connected with one another, but rather radial surfaces, as a result of which a more favourable force profile is made possible by means of the connecting elements between the fuselage barrels.

The inventive transverse joint can be loaded such that with a suitable choice of the connecting elements these are arranged adjacent to one another in a single row for purposes of connecting the fuselage barrels. By this means the number of connecting elements, and thus the assembly, is further simplified.

In particular the connecting elements can pass through the connecting segments in the vicinity of stringers, so that stringer couplings can be dispensed with.

The connecting elements are preferably tension bolts. These are of reliable design, simple to assemble, can be replaced and are cost-effective.

The radial surfaces preferably close flush with a respective ring surface of the fuselage barrels. This makes possible an even axial gap between the connecting segments and the ring surfaces during assembly. The axial gap can be filled with at least two sealing elements with different functions and/or properties. By this means, for example, a pressure-tight seal can be achieved between the fuselage barrels, and optimal aerodynamic properties can be achieved in an outer region of the axial gap.

The ring-type connecting segments in the assembled state preferably form a two-part frame. This has the advantage that the number of parts in the transverse joint region is further reduced and the fuselage can be embodied in a weight-optimised manner.

Other advantageous examples of embodiment are the subject of further subsidiary claims.

The connecting segments are either a single part, or consist of a plurality of curved segments. Thus they can, for example, be a single part fibre-reinforced woven plastic component, or can be composed of metallic curved segments.

In addition to tension bolts, rivets, pins, tension rods and similar can also be conceived as connecting elements.

The sealing elements in the axial gap can be surface seals or sealants.

BRIEF DESCRIPTION OF THE DRAWINGS

In what follows preferred examples of embodiment of the invention are elucidated in more detail with the aid of schematic representations. Here.

DETAILED DESCRIPTION

In the figures the same design elements are allocated the same reference numbers.

Figure 1:
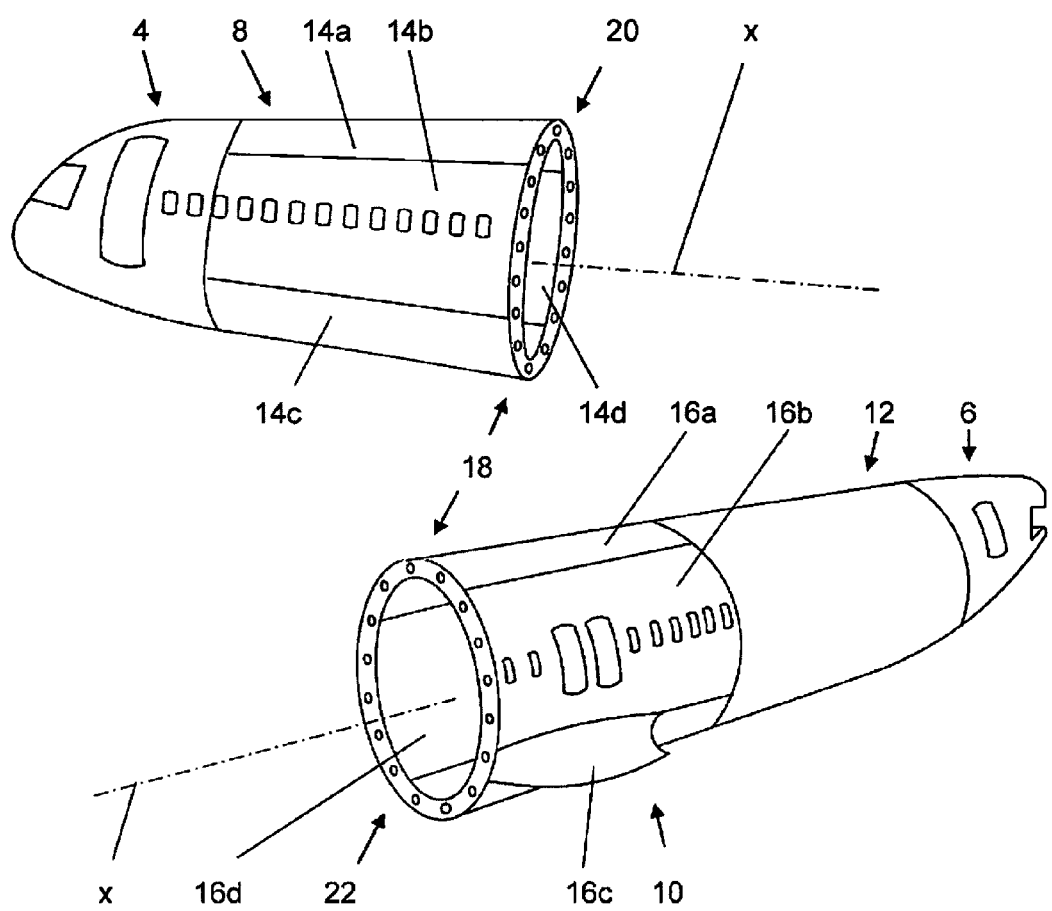
FIG. 1 shows a representation in perspective of an inventive aircraft fuselage split into two parts.

FIG. 1 shows an inventive aircraft fuselage 2 with a cockpit 4, a tail section 6 and a front fuselage barrel 8, a wing-region fuselage barrel 10, and a rear fuselage barrel 12, arranged between the cockpit 4 and the tail section 6. The fuselage barrels, or fuselage sections, 8, 10, 12 consist in each case of four individual skin fields 14a, 14b, ..., 16a, 16b, ..., which are connected with one another by means of longitudinal seams, not numbered, extending in the direction of an aircraft longitudinal axis x.

For purposes of a better understanding of the invention the aircraft fuselage 2 shown is represented opened up in the transverse joint region 18 between the front fuselage barrel 8 and the wing-region fuselage barrel 10. In accordance with the invention, and representative of other transverse joint regions 18, the connection of these two fuselage barrels 8, 10 takes place by means of two ring-type connecting segments 20, 22, which are inserted into the fuselage barrels 8, 10 and clamped together. A detailed examination of the connecting segments 20, 22 is undertaken in the following figures.

Figure 2:
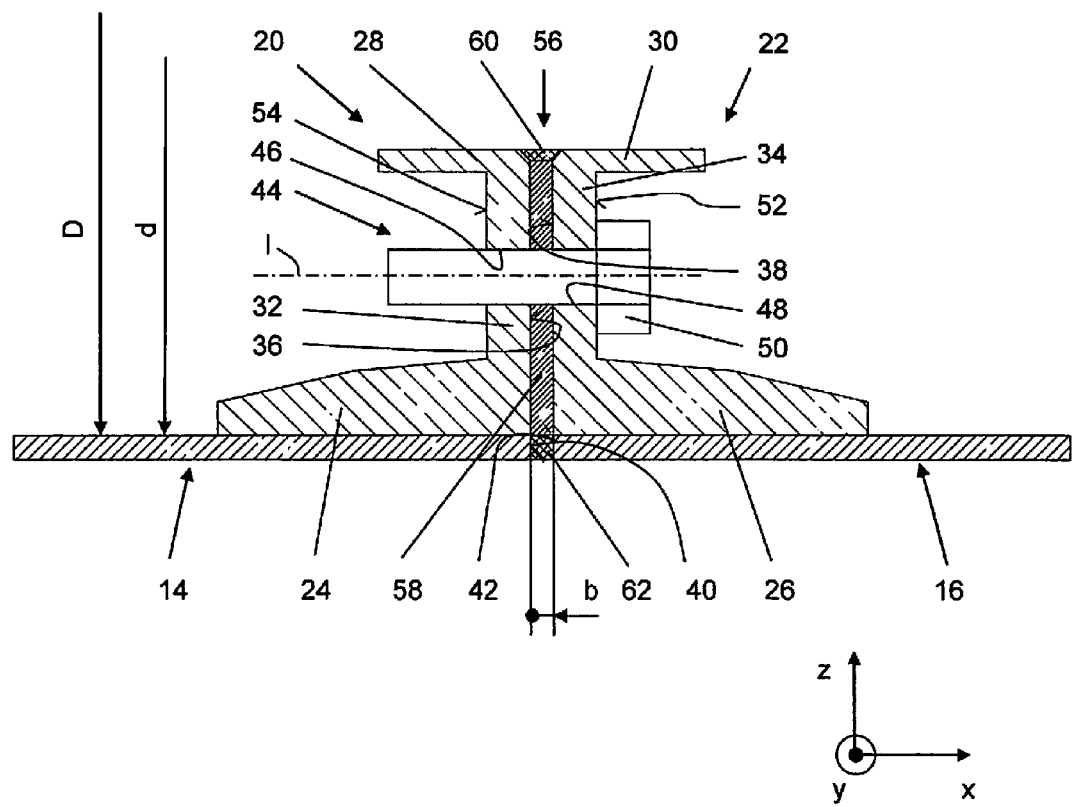
FIG. 2 shows a cross-section through an inventive transverse joint.

FIG. 2 shows a cross-section through an inventive transverse joint region 18 with two connecting segments 20, 22 clamped together. The connecting segments 20, 22 are manufactured from any material that is suitable for aerospace applications, such as aluminium, or an appropriate mix of materials. They consist of individual curved segments and are closed over their periphery. They have an outer diameter d, which corresponds to an outer diameter D of the fuselage cross-section in the transverse joint region 18. Thus the connecting segments 20, 22 reproduce the fuselage cross-section in the transverse joint region 18. They have in each case a foot section 24, 26, a head section 28, 30, and a web 32, 34 extending between these sections. The foot sections 24, 26 are in each case designed in the shape of a wedge and on the inner periphery are securely connected with a skin field 14, 16, for example by means of rivets, not shown. The connecting segments 20, 22 are positioned on the skin field 14, 16 such that in each case a radial surface 36, 38 extending from the foot section 24, 26 via the web 32, 34 to the head section 28, 30 closes flush with a ring surface 40, 42 of the skin fields 14, 16.

The connecting segments 20, 22 are connected with one another by means of a multiplicity of connecting elements 44, in particular tension bolts. In the state in which they are connected with one another the connecting segments 20, 22 form a two-part frame, i.e. a peripheral stiffener, and thus undertake additional stiffening functions in addition to functioning purely as a transverse joint.

The tension bolts 44, extend in a single row in the aircraft longitudinal direction x and in the peripheral direction y are evenly spaced apart from one another. They are arranged in the connecting segments 20, 22 in the vicinity of stringers, i.e. longitudinal stiffeners, not shown, as a result of which conventional stringer couplings can be dispensed with in the transverse joint region 18. Each tension bolt 44 is accommodated in a web-region hole pair, which consists of two holes 46, 48. The holes 46, 48 are in each case introduced into the webs 32, 34, and aligned with one another such that they form a common hole longitudinal axis 1. For purposes of clamping the connecting segments 20, 22 the tension bolts 44 sit in each case with their head 50 on a bearing surface 52 of the one web 34 and engage with a nut, not represented, on a clamping surface 54 of the other web 32. The bearing surface 52 and the clamping surface 54 extend in each case in the radial direction and thus at right angles to the hole longitudinal axis 1.

Between the connecting segments 20, 22, i.e. between their opposing radial surfaces 36, 38, an axial gap 56 is formed with a constant width b, which for purposes of a pressure-tight connection of the aircraft fuselage 2 is filled with a sealant 58. In the region of the head sections 28, 30 the axial gap 56 is widened out into a V-shape and is filled with a sealing bead 60. A gap section between the opposing ring surfaces 40, 42 of the skin fields 14, 16 is closed by means of an aerodynamic sealing bead 62.

Figure 3:
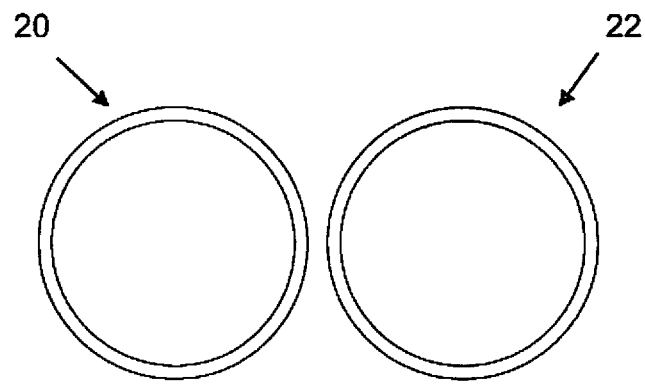
FIGS. 3 to 6 show steps in the method for the manufacture of the transverse joint of FIG. 2.
Figure 4:
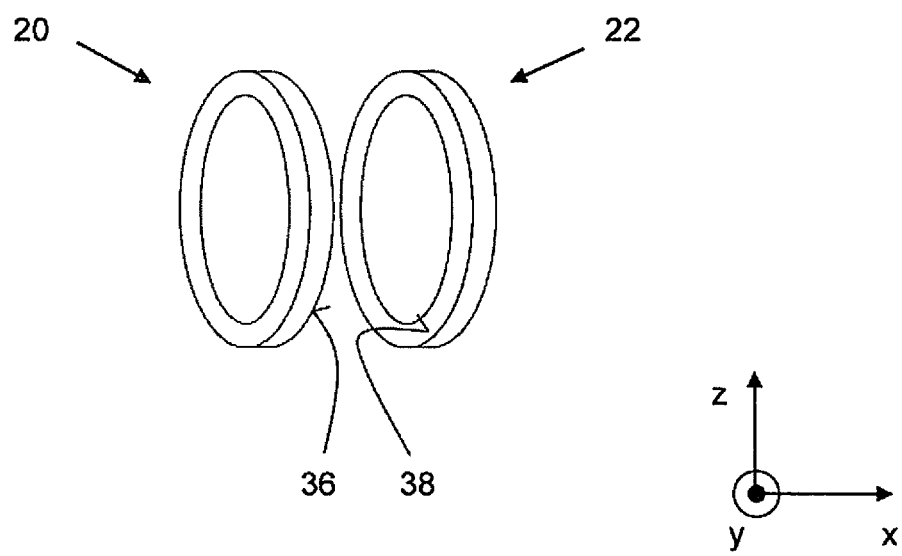
Figure 5:
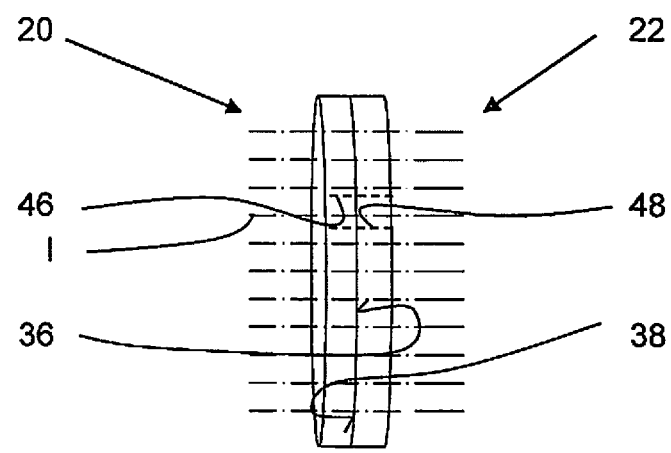
Figure 6:
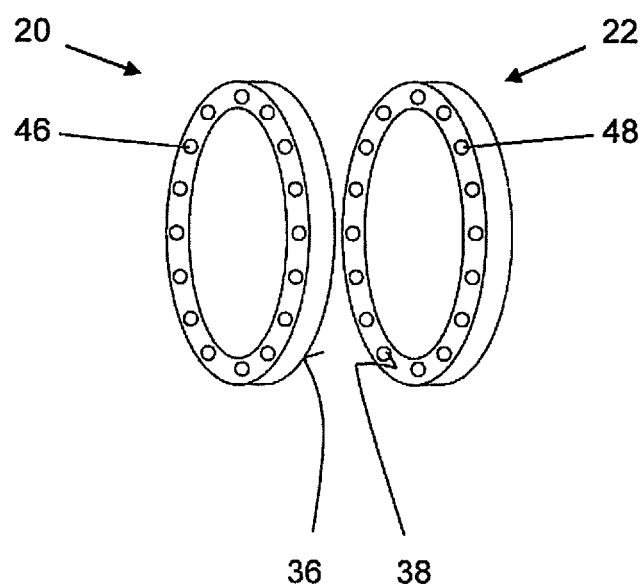

In the following figures the manufacture of an inventive transverse joint is elucidated:

In accordance with FIG. 3 two ring-type connecting segments 20, 22 are prepared, which reproduce the cross-section of an aircraft fuselage 2 in the transverse joint region 18 to be formed. The two connecting segments 20, 22 are then brought together in accordance with FIG. 4 and aligned with one another such that their radial surfaces 36, 38 are facing one another, and component, i.e. production, tolerances between the two connecting segments 20, 22 are eliminated. In particular the connecting segments 20, 22 are aligned with one another such that in the later fuselage barrel assembly no significant displacement of the fuselage barrels 8, 10 occurs about the aircraft longitudinal axis x. After the alignment the radial surfaces 36, 38 are laid plane against one another in accordance with FIG. 5, and holes 46, 48 are introduced into the connecting segments 20, 22, in each case with a common hole longitudinal axis 1, for the accommodation of tension bolts 44 or comparable connecting elements. Just one hole pair is numbered in a manner representative for all holes and hole longitudinal axes 1. The holes 46, 48 are already produced to their final dimensions, so that the need for any later cleaning of the holes 46, 48 or any corresponding reaming during the assembly of the fuselage barrels 8, 10 is eliminated. After the introduction of the holes 46, 48, i.e. hole pairs, the connecting segments 20, 22 are separated in accordance with FIG. 6 and the holes 46, 48 are appropriately reworked, for example are deburred. The connecting segments 20, 22 are then assigned to a section assembly and fuselage barrels 8, 10 are constructed around the connecting segments 20, 22 by the arrangement, i.e. fitting, of skin fields 14, 16 (cf. FIG. 1). The attachment of the skin fields 14, 16 to foot sections 24, 26 of the connecting segments 20, 22 is undertaken by means of rivets. After manufacture of the fuselage barrels 8, 10 these are brought to final assembly for the connection of the individual fuselage barrels 8, 10 in the transverse joint region 18.

During final assembly the fuselage barrels 8, 10 are positioned in accordance with the hole longitudinal axes 1 of the holes 46, 48 and the tension bolts 44 are inserted into the hole pairs. Here there is no need for any compensation of tolerances between the fuselage barrels 8, 10 to be joined in the transverse joint region 18, since this has already been accounted for during the introduction of the holes 46, 48 into the connecting segments 20, 22. Likewise there is no need for any reaming of the holes 46, 48, since they already have their final dimensions and have been appropriately cleaned and/or deburred. A sealant 58 is applied to one of the radial surfaces 36, 38, and the connecting segments 20, 22, and thus the fuselage barrels 8, 10 are clamped together in a pressure-tight manner by means of the tension bolts 44 (cf. FIG. 2). Finally a radially inner sealing bead 60 and a radially outer aerodynamic sealing bead 60 are arranged between the connecting segments 20, 22, i.e. between the skin fields 14, 16.

Disclosed is a method for the manufacture of an aircraft fuselage 2 with at least two fuselage barrels 8, 10, 12, wherein connecting segments 20, 22 are firstly prepared for the formation of a transverse joint region 18 for a later transverse joint, and the fuselage barrels 8, 10 are then constructed around the connecting segments 20, 22; also disclosed is an aircraft fuselage 2 with ring-type connecting segments 20, 22 for the formation of such a transverse joint.

REFERENCE SYMBOL LIST

2 Aircraft fuselage
4 Cockpit
6 Tail section
8 Front fuselage barrel
10 Wing-region fuselage barrel
12 Rear fuselage barrel
14 Skin field
16 Skin field
18 Transverse joint region
20 Connecting segment
22 Connecting segment
24 Foot section
26 Foot section
28 Head section
30 Head section
32 Web
34 Web
36 Radial surface
38 Radial surface
40 Ring surface
42 Ring surface
44 Tension bolt
46 Hole
48 Hole
50 Head
52 Bearing surface
54 Clamping surface
56 Axial gap
58 Sealant
60 Sealing bead
62 Sealing bead
x Aircraft longitudinal axis
l Hole longitudinal axis
d Outer diameter
D Outer diameter
b Width
y Peripheral direction

What is claimed is:

1. A method of manufacturing an aircraft fuselage with at least two fuselage barrels, the method comprising:
   aligning and preparing transverse joint elements with one another before joining the at least two fuselage barrels by a provisional formation of a transverse joint by:
      preparing two ring-type connecting segments with identical diameters, which reproduce a fuselage cross-section in a transverse joint region;
      connecting and aligning the two ring-type connecting segments with one another;
      introducing seatings into the two ring-type connecting segments for accommodating connecting elements;
      separating the two ring-type connecting segments;
   manufacturing the at least two fuselage barrels by arranging skin fields on the two ring-type connecting segments; and
   connecting the fuselage barrels by inserting the transverse joint elements into the at least two fuselage barrels, such that the at least two fuselage barrels are connected with one another in the transverse joint region by the transverse joint elements including the two ring-type connecting segments and by bringing together the two ring-type connecting segments and by inserting the connecting elements.

2. The method in accordance with claim 1, further comprising accommodating the connecting elements in holes, which pass through radial surfaces of the two ring-type connecting segments.

3. The method in accordance with claim 2, wherein the radial surfaces in each case close flush with a ring surface of the fuselage barrels.

4. The method in accordance with claim 3, further comprising arranging at least two different sealing elements in an axial gap between the radial surfaces.

5. The method in accordance with claim 1, further comprising arranging the connecting elements adjacent to one another in a single row.

6. The method in accordance with claim 5, wherein the connecting elements are arranged in a vicinity of stringers.

7. The method in accordance with claim 5, wherein the connecting elements are tension bolts.

8. The method in accordance with claim 1, wherein in an assembled state, the two ring-type connecting segments form a frame.

* * * * *